United States Patent
Prezecki, II

(10) Patent No.: US 9,725,043 B2
(45) Date of Patent: Aug. 8, 2017

(54) CARGO COVER ASSEMBLY WITH GAP-HIDING PANELS

(71) Applicant: FORD GLOBAL TECHNOLOGIES, LLC, Dearborn, MI (US)

(72) Inventor: Leonard Gus Prezecki, II, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/867,829

(22) Filed: Sep. 28, 2015

(65) Prior Publication Data

US 2017/0088057 A1    Mar. 30, 2017

(51) Int. Cl.
    *B60R 5/04* (2006.01)
(52) U.S. Cl.
    CPC .................. *B60R 5/047* (2013.01)
(58) Field of Classification Search
    CPC ..................................... B60R 5/047
    USPC ..................................... 296/24.43
    See application file for complete search history.

(56) References Cited

U.S. PATENT DOCUMENTS

| | | | |
|---|---|---|---|
| 4,277,097 A | 7/1981 | Lalanne | |
| 5,427,288 A * | 6/1995 | Trubee | B60R 7/02 224/539 |
| 5,630,460 A * | 5/1997 | Yuan | B60H 1/00592 160/120 |
| 5,685,592 A * | 11/1997 | Heinz | B60N 3/10 224/925 |
| 5,716,091 A * | 2/1998 | Wieczorek | B60R 7/02 224/275 |
| 6,213,186 B1 * | 4/2001 | Torres | B60J 1/2038 160/24 |
| 7,080,867 B2 * | 7/2006 | Woerner | B60R 5/047 296/24.43 |
| 7,644,972 B2 * | 1/2010 | Lim | B60R 5/047 296/24.43 |
| 7,896,418 B2 * | 3/2011 | Hofmann | B60R 5/044 296/24.34 |

(Continued)

FOREIGN PATENT DOCUMENTS

| | | | |
|---|---|---|---|
| DE | 102006061963 A1 | 6/2008 | |
| FR | EP 1886874 A1 * | 2/2008 | ............ B60R 5/047 |

(Continued)

OTHER PUBLICATIONS

English machine translation of DE102006061963A1.
English machine translation of JP2006088934A.
English machine translation of JPH07149188A.

*Primary Examiner* — Pinel Romain
(74) *Attorney, Agent, or Firm* — Vichit Chea; King & Schickli, PLLC

(57) ABSTRACT

A cargo cover assembly is provided. That cargo cover assembly includes a cargo area cover and a flipper panel. The flipper panel has a proximal end pivotally connected to the cargo area cover and a distal end carrying a roller for engaging a back of the seat that is located vehicle forward of the cargo area cover. The cargo area cover includes a housing, a cover-retracting mechanism held in the housing and a flexible cover displaceable between extended and retracted positions. One or more storage compartments may be provided in the flipper panel and storage hooks may be adjustably mounted to the housing of the cargo area cover.

19 Claims, 5 Drawing Sheets

(56) References Cited

U.S. PATENT DOCUMENTS

| | | | |
|---|---|---|---|
| 8,011,711 B2 * | 9/2011 | Hirayama | B60R 5/047 296/136.03 |
| 8,544,929 B2 | 10/2013 | Brown | |
| 9,016,758 B1 * | 4/2015 | Lee | B60R 5/047 296/100.11 |
| 9,302,627 B1 * | 4/2016 | Shahmehri | B60R 5/047 |
| 2014/0319888 A1 | 10/2014 | Inedia et al. | |

FOREIGN PATENT DOCUMENTS

| | | | | |
|---|---|---|---|---|
| FR | EP 1892152 A1 * | 2/2008 | | B60R 5/047 |
| JP | H071491888 A | 6/1995 | | |
| JP | 2006088934 A | 4/2006 | | |

\* cited by examiner

CARGO COVER ASSEMBLY WITH GAP-HIDING PANELS

TECHNICAL FIELD

This document relates generally to the motor vehicle equipment field and, more specifically, to a cargo cover assembly including a retractable tonneau cover, a cover-retracting mechanism held in a housing and pivoting flipper panels to hide the gap between the housing and reclining seats of the motor vehicle.

BACKGROUND

Certain motor vehicles, such as sport utility vehicles (SUVs) and crossover utility vehicles (CUVs), have an open rear cargo area that may incorporate a retractable tonneau cover, including a cover-retracting mechanism held in a housing. The cover may be extended from the housing to conceal the rear cargo area vehicle rearward of the rear seats of the motor vehicle or retracted back into the housing to expose that cargo area.

Many such vehicles are also equipped with rear seats that may be adjustably reclined at different angles. As should be appreciated, the gap between the housing holding the cover-retracting mechanism and the back of the rear seats varies depending upon the recline angle of those seats.

In order to provide a more aesthetically pleasing appearance as well as to fully conceal the rear cargo area, the gap between the back of the rear seats and the cover-retracting mechanism housing must be closed. One such approach for closing that gap is disclosed in U.S. Pat. No. 9,0161,758 which is assigned to Ford Global Technologies, LLC.

This document relates to an alternative method for closing that gap relying upon one or more flipper panels. These flipper panels may incorporate a roller to engage with and roll along the back of the rear seat so that the flipper panels smoothly and efficiently follow the rear seat during adjustment of the recline angle of the rear seat. Further, the flipper panels may include an easily accessible and convenient storage compartment for holding small items such as cell phones, electronic music players and the like.

SUMMARY

In accordance with the purposes and benefits described herein, a cargo cover assembly is provided. That cargo cover assembly comprises a cargo area cover and a flipper panel. The flipper panel has a proximal end pivotally connected to the cargo area cover and a distal end carrying a roller for engaging the back of a seat that is vehicle forward of the cargo area cover. The cargo area cover may comprise a housing, a cover-retracting mechanism held in the housing and a flexible cover that is displaceable between a storage position retracted within the housing and a cargo-concealing position extended from the housing.

More specifically, the proximal end of the flipper panel is pivotally connected to the housing and the flipper panel is biased toward a fully extended position.

In one possible embodiment, the cargo cover assembly further includes a second flipper panel having a second proximal end pivotally connected to the housing and a second distal end carrying a second roller for engaging the back of a second section of the rear seat that is located vehicle forward of the cargo area cover.

In one possible embodiment, at least one storage compartment is carried on the flipper panel. That at least one storage compartment has an opening closer to the proximal end than the distal end of the flipper panel.

Further, at least one storage hook may be carried on the housing. Still further, an elongated track may be provided on the housing for receiving and holding the storage hook.

In accordance with an additional aspect, a cargo cover assembly is provided that comprises a cargo area cover including a housing, a cover-retracting mechanism and a flexible cover. Further, the cargo cover assembly includes at least one storage hook carried on the housing.

In addition, the cargo cover assembly may include an elongated track on the housing for receiving and holding the storage hook. Still further, the cargo cover assembly may include a fastener for securing the storage hook to the elongated track in any of a number of different positions.

In accordance with still another aspect, a cargo cover assembly is provided that comprises a cargo area cover and a flipper panel. The flipper panel has a proximal end pivotally connected to the cargo area cover and a distal end engaging a back of a seat located vehicle forward of the cargo area cover. Further, the flipper panel includes at least one storage compartment. That storage compartment has an opening closer to the proximal end than the distal end.

In accordance with still another aspect, a motor vehicle is provided incorporating the cargo cover assembly.

In the following description, there are shown and described several preferred embodiments of the cargo cover assembly. As it should be realized, the cargo cover assembly is capable of other, different embodiments and its several details are capable of modification in various, obvious aspects all without departing from the cargo cover assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo cover assembly and together with the description serve to explain certain principles thereof. In the drawing figures:

FIG. 1 is a rear perspective view of a motor vehicle equipped with the cargo cover assembly.

FIG. 2 is a schematic and partially cross-sectional view of the cargo cover assembly illustrating the flipper panel that is pivotally connected to the cover-retracting mechanism housing. That flipper panel is shown in full line in the fully extended position engaging the back of the rear seat when it is in a fully upright position and in phantom line in a fully retracted position when the rear seat has been fully reclined.

DETAILED DESCRIPTION

Reference will now be made in detail to the present preferred embodiments of the cargo cover assembly, examples of which are illustrated in the accompanying drawing figures.

Figure 1:
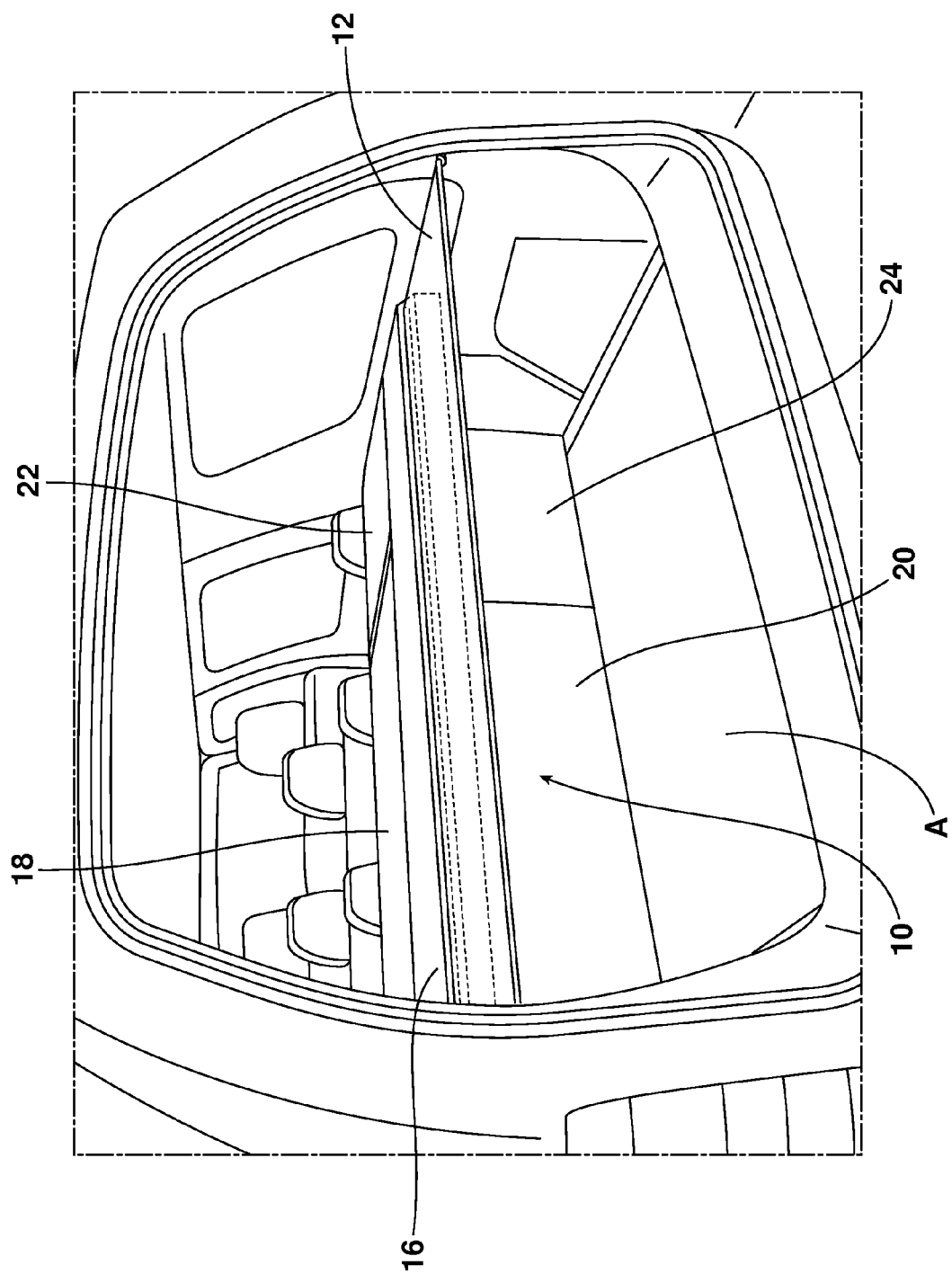
Figure 2:
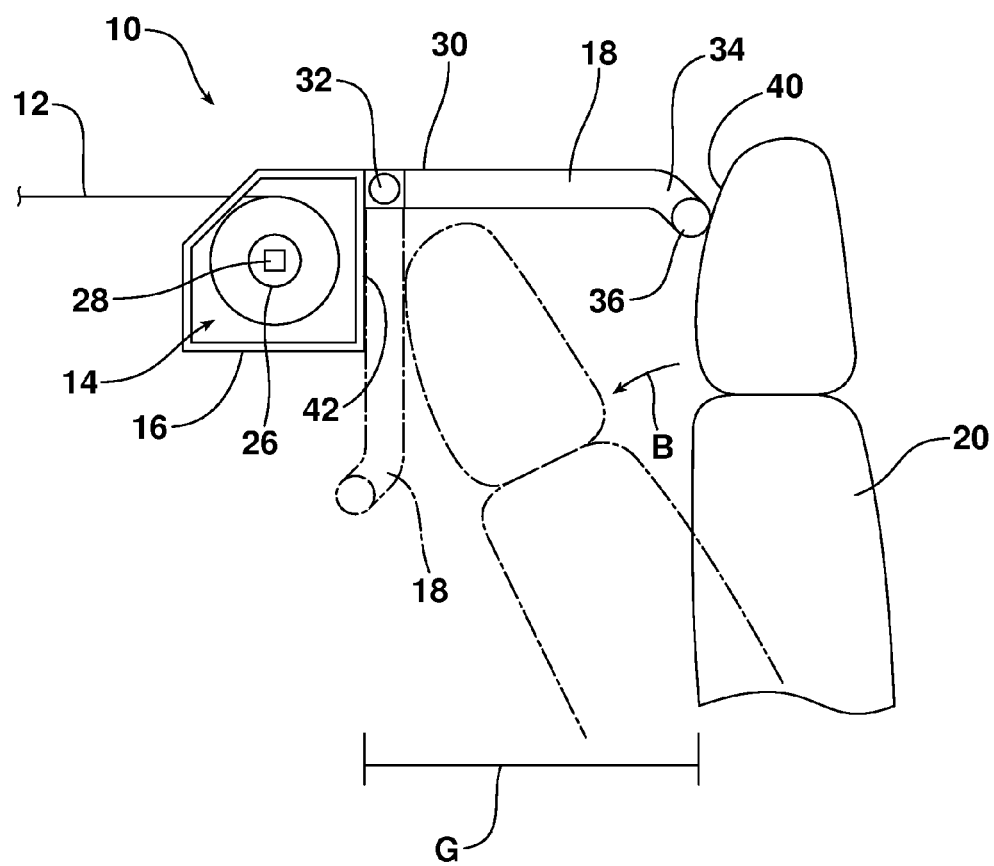

Reference is now made to FIGS. 1 and 2 illustrating a motor vehicle M incorporating the cargo cover assembly 10 that is the subject matter of this document. As illustrated, the cargo cover assembly 10 includes a flexible cover 12 and a cover-retracting mechanism 14 held in a housing 16. The assembly 10 further includes a first flipper panel 18 extending between the housing 16 and a first section 20 of the rear seat and a second flipper panel 22 extending between the housing 16 and a second section 24 of the rear seat.

As should be appreciated from reviewing FIGS. 1 and 2 in combination, the first flipper panel 18 functions to close the gap between the housing 16 and the back of the first rear seat section 20 while the second flipper panel 22 functions to close the gap between the housing 16 and the back of the second rear seat section 24. Thus, it should be appreciated that the first flipper panel 18 has a width corresponding to the width of the first section 20 of the rear seat while the second flipper panel 22 has a width corresponding to the width of the second section 24 of the rear seat.

When the flexible cover 12 is fully extended from the housing 16, the cover 12 effectively conceals the underlying rear cargo area A behind the rear seat sections 20, 24. When it is desired to uncover that cargo area A, the cover 12 is retracted back into the housing 16. This is accomplished utilizing the cover retracting mechanism 14 which is of the type generally known in the art. Such a mechanism 14 includes a roller 26 onto which the cover 12 is wound and retracted or unwound and extended and a rotary drive element 28 which may take the form of a torsion spring. The rotary drive element 28 element torsionally biases the roller 26 to generate a tension acting on the cover 12, tending to pull the cover into the housing 16.

The operation of the flipper panels 18, 22 will now be described in detail with reference to FIG. 2. As illustrated in that Figure, the flipper panel 18 includes a proximal end 30 that is connected by means of a spring hinge 32 to the housing 16. The flipper panel 18 also includes a distal end 34 that carries a roller 36. The spring hinge 32 biases the flipper panel 18 into the fully extended position which is shown in full line in FIG. 2. Thus, when rear seat section 20 is in a full upright position as illustrated in full line in FIG. 2, the roller 36 engages the back 40 of the seat section 20 and the flipper panel 18 fully closes the gap G between the housing 16 and the seat section 20.

In the event the seat section 20 is reclined in the direction of action arrow B, the roller 36 initially rolls along the back 40 of the seat section 20 so as to remain engaged with the seat back 40. This ensures smooth operation and transition of the flipper panel 18. As the seat is reclined further, the back 40 of the seat section 20 actually engages the downwardly depending distal end 34 of the flipper panel 18. When the seat back 38 is fully reclined (shown in phantom line position), the flipper panel 18 is in the fully retracted position (note phantom line position) resting against the forward wall 42 of the housing 16.

While not illustrated, it should be appreciated that the second flipper panel 22 operates in the same manner as the first flipper panel 18 against the second section 24 of the rear seat. In either instance, the rollers 36 at the distal ends 34 of the flipper panels 18, 20 ensure that the flipper panels 18, 20 do not stick in the extended position as the seat sections 20, 24 are reclined and smoothly pivot about the spring hinge 32 against the seat back 40 as required.

Figure 3:
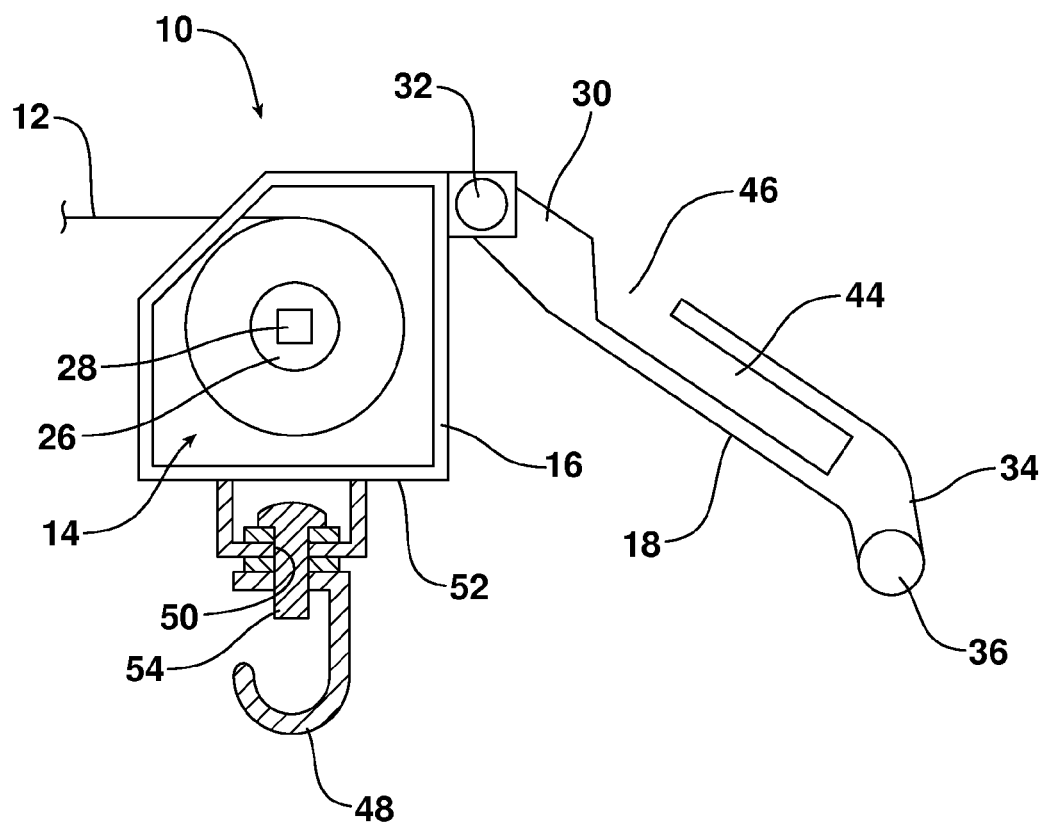
FIG. 3 is a detailed schematic view of an alternative embodiment of the cargo cover assembly incorporating a storage compartment in the flipper panel. As should also be appreciated, the bottom wall of the cover-retracting mechanism housing also incorporates an elongated track for receiving a storage hook.
Figure 4:
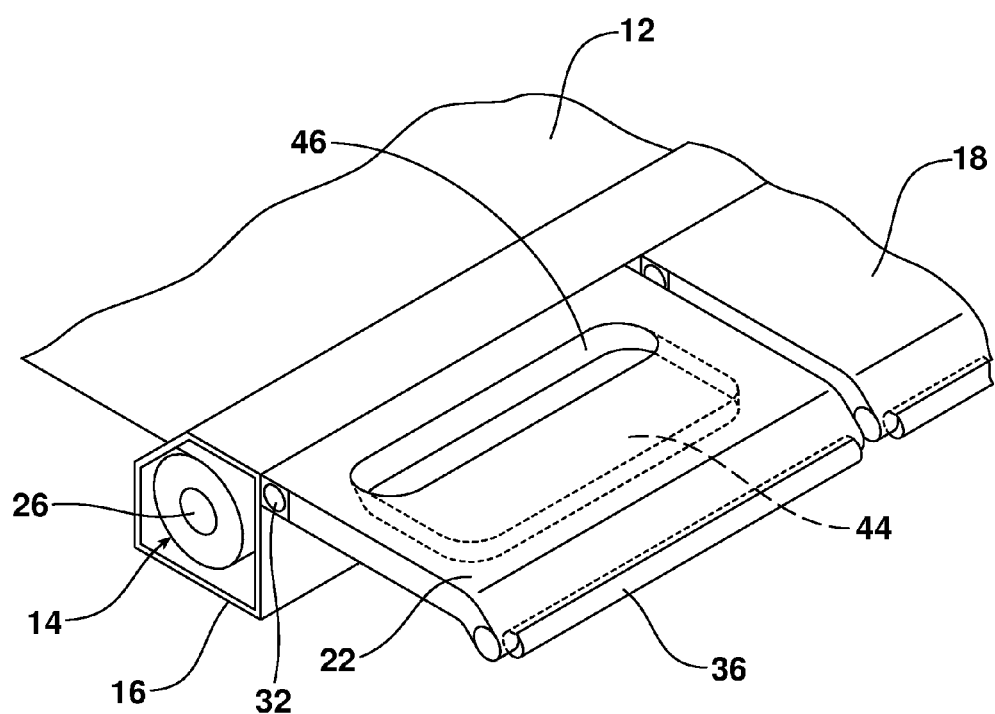
FIG. 4 is a detailed perspective view from above illustrating the storage panel flipper compartment, including particularly the opening to access that compartment.
Figure 5:
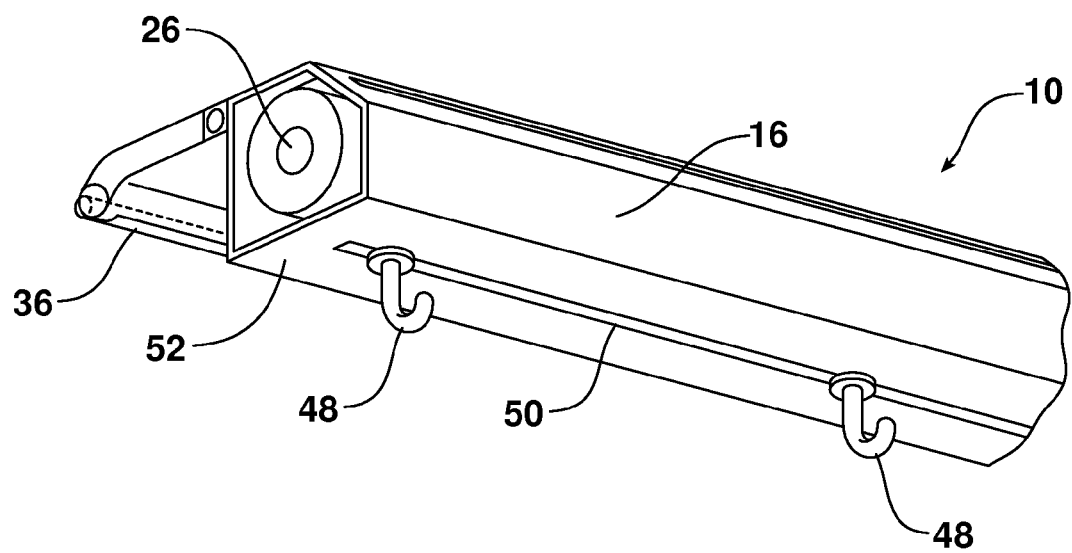
FIG. 5 is a perspective view from below of the embodiment illustrated in FIG. 3 illustrating the elongated track that runs along the bottom wall of the cover-retracting mechanism housing and two hooks that may be positioned substantially anywhere along the length of the track.

Reference is now made to FIGS. 3-5 illustrating an alternative embodiment of the cargo cover assembly 10. As best illustrated in FIGS. 3 and 4, the flipper panel 18 may include an integral storage compartment 44 having an access opening 46 that is oriented closer to the proximal end 30 than the distal end 34. Thus, the access opening 46 is oriented toward the top of the storage compartment 44 as the flipper panel 18 pivots down when the rear seat section 20 is reclined. As should be appreciated, the storage compartment 44 and access opening 46 are conveniently located for the rear seat occupant to reach over the rear seat and store small items such as a cell phone, keys, electronic music devices, and the like.

As further illustrated in FIGS. 3 and 5, at least one storage hook 48 is carried on the housing 16 of the cargo cover assembly 10. More specifically, an elongated rail or track 50 extends along the bottom wall 52 of the housing 16. A fastener 54, in the form of a screw lock, secures one or more storage hooks 48 in substantially any desired position along the track 50. Such hooks 48 may be conveniently used to hold any item with a strap or handle such as plastic shopping bags or the like, and prevent them from freely moving around the storage area during vehicle operation. Thus, the storage hooks 48 may be utilized to prevent potential damage and rattling of items when traveling between a store and home.

The foregoing has been presented for purposes of illustration and description. It is not intended to be exhaustive or to limit the embodiments to the precise form disclosed. Obvious modifications and variations are possible in light of the above teachings. For example, the entire cargo cover assembly 10 may be mounted on the motor vehicle M by means of retracting pins or fixed pins that allow for removal of the cargo cover assembly from the vehicle if desired. All such modifications and variations are within the scope of the appended claims when interpreted in accordance with the breadth to which they are fairly, legally and equitably entitled.

What is claimed:

1. A cargo cover assembly, comprising:
   a cargo area cover; and
   a flipper panel having a proximal end pivotally connected to said cargo area cover and a distal end carrying a roller for engaging a back of a seat that is located vehicle forward of said cargo area cover.

2. The cargo cover assembly of claim 1, wherein said cargo area cover comprises a housing, a cover retracting mechanism held in said housing and a flexible cover displaceable between a storage position retracted within said housing and a cargo concealing position extended from said housing.

3. The cargo cover assembly of claim 2, wherein said proximal end of said flipper panel is pivotally connected to said housing and said flipper panel is biased toward a fully-extended position.

4. The cargo cover assembly of claim 3, further including a second flipper panel having a second proximal end pivotally connected to said housing and a second distal end carrying a second roller for engaging said back of a second section of said rear seat that is located vehicle forward of said cargo area cover.

5. The cargo cover assembly of claim 2, further including at least one storage compartment carried on said flipper panel.

6. The cargo cover assembly of claim 5, wherein said at least one storage compartment has an opening closer to said proximal end than to said distal end.

7. The cargo cover assembly of claim 5, further including at least one storage hook carried on said housing.

8. The cargo cover assembly of claim 7, further including an elongated track on said housing for receiving and holding said at least one storage hook.

9. The cargo cover assembly of claim 2, further including at least one storage hook carried on said housing.

10. The cargo cover assembly of claim 9, further including an elongated track on said housing for receiving and holding said at least one storage hook.

11. A cargo cover assembly, comprising:
a cargo area cover including a housing, a cover retracting mechanism and a flexible cover; and
at least one storage hook carried on said housing.

12. The cargo cover assembly of claim 11, further including an elongated track on said housing for receiving and holding said at least one storage hook.

13. The cargo cover assembly of claim 12, further including a fastener for securing said at least one storage hook to said elongated track in any one of a number of different positions.

14. The cargo cover assembly of claim 13, wherein said track is carried on a bottom wall of said housing.

15. A cargo cover assembly, comprising:
a cargo area cover, wherein said cargo area cover comprises a housing, a cover retracting mechanism held in said housing and a flexible cover displaceable between a storage position retracted within said housing and a cargo concealing position extended from said housing; and
a flipper panel having a proximal end pivotally connected to said cargo area cover and a distal end engaging a back of a seat that is located vehicle forward of said cargo area cover, said flipper panel including at least one storage compartment.

16. The cargo area cover assembly of claim 15, wherein said at least one storage compartment has an opening closer to said proximal end than to said distal end.

17. The cargo cover assembly of claim 15, wherein said proximal end of said flipper panel is pivotally connected to said housing and said flipper panel is biased toward a fully-extended position.

18. The cargo cover assembly of claim 17, further including a second flipper panel having a second proximal end pivotally connected to said housing and a second distal end engaging said back of a second section of said rear seat that is located vehicle forward of said cargo area cover.

19. A motor vehicle incorporating the cargo cover assembly of claim 1.

* * * * *